United States Patent
Watanabe et al.

(10) Patent No.: US 7,928,619 B2
(45) Date of Patent: Apr. 19, 2011

(54) GAP WINDING MOTOR

(75) Inventors: Kazuya Watanabe, Fukuoka (JP);
Masahiko Tanabe, Fukuoka (JP)

(73) Assignee: Kabushiki Kaisha Yaskawa Denki, Fukuoka (JP)

(*) Notice: Subject to any disclaimer, the term of this patent is extended or adjusted under 35 U.S.C. 154(b) by 0 days.

(21) Appl. No.: 12/483,136

(22) Filed: Jun. 11, 2009

(65) Prior Publication Data
US 2009/0243424 A1 Oct. 1, 2009

Related U.S. Application Data

(63) Continuation of application No. PCT/JP2007/073858, filed on Dec. 11, 2007.

(30) Foreign Application Priority Data

Jan. 18, 2007 (JP) ................................ 2007-008924

(51) Int. Cl.
*H02K 3/47* (2006.01)

(52) U.S. Cl. ... 310/71; 310/208; 310/179; 310/216.002; 310/216.004; 310/216.005

(58) Field of Classification Search ............... 310/71, 310/216.002, 216.004, 316.005, 216.009, 310/216.015, 216.016, 112, 179, 180, 208
See application file for complete search history.

(56) References Cited

U.S. PATENT DOCUMENTS

| | | | | |
|---|---|---|---|---|
| 3,082,337 A * | 3/1963 | Horsley | ................... | 310/179 |
| 4,837,921 A * | 6/1989 | Tassinario | ................... | 29/596 |
| 4,843,269 A * | 6/1989 | Shramo | ................... | 310/208 |
| 4,937,485 A * | 6/1990 | Mihalko | ................... | 310/208 |
| 5,525,850 A * | 6/1996 | Stinson | ................... | 310/194 |
| 5,710,474 A * | 1/1998 | Mulgrave | ............. | 310/216.002 |
| 5,714,828 A * | 2/1998 | Ackermann et al. | ... | 310/216.002 |
| 6,204,586 B1 * | 3/2001 | Umeda et al. | ............. | 310/179 |
| 6,288,462 B1 * | 9/2001 | Tanaka et al. | ............. | 310/71 |
| 7,268,458 B2 * | 9/2007 | Lee et al. | ............. | 310/216.074 |
| 7,592,728 B2 * | 9/2009 | Jones et al. | ............. | 310/112 |
| 2005/0258707 A1 * | 11/2005 | Shteynberg et al. | ............. | 310/218 |
| 2009/0243424 A1 * | 10/2009 | Watanabe et al. | ...... | 310/216.109 |

FOREIGN PATENT DOCUMENTS

| | | | |
|---|---|---|---|
| JP | 63-133734 U | | 9/1988 |
| JP | 06-141500 | * | 5/1994 |
| JP | 09/233738 | | 9/1997 |

(Continued)

OTHER PUBLICATIONS

Machine Translation: JP 2006187146, "Neutral Point Fixing Structure of a Motor", Eiji Miyashita, Jul. 13, 2006.* Machine Translation of JP 06-141500, "coreless motor", Hideki Itaya and Yuki Hamada, May 20, 1994.*
Machine Translation of JP 2002-272049, "soltless motor" (Slotless Motor), Teruhiko Aoki and Kenji Watanabe, Sep. 20, 2002.*

*Primary Examiner* — Karl I Tamai
(74) *Attorney, Agent, or Firm* — Ditthavong Mori & Steiner, P.C.

(57) ABSTRACT

A gap winding motor includes a stator and a rotor. The stator includes a stator core and air-core coils for generating a rotating magnetic field which are attached to an inner peripheral surface of the stator core. The rotor is disposed so as to face the stator with an air gap therebetween. A stator core is divided into two core portions in an axial direction of the motor, and a spacer is disposed between the core portions. A unique air-gap section is provided between the core portions, and coil terminal processes are performed in the air-gap section between the core portions.

9 Claims, 2 Drawing Sheets

FOREIGN PATENT DOCUMENTS

| | | | |
|---|---|---|---|
| JP | 11055882 | * | 2/1999 |
| JP | 2002209357 | * | 7/2002 |
| JP | 2002-272049 | | 9/2002 |
| JP | 2005-168123 | | 6/2005 |
| JP | 2005151719 | * | 6/2005 |
| JP | 2006014460 | * | 1/2006 |
| JP | 2006187146 | * | 7/2006 |
| JP | 2007-129785 | | 5/2007 |
| JP | 2010148170 | * | 7/2010 |

* cited by examiner

GAP WINDING MOTOR

CROSS-REFERENCE TO RELATED APPLICATION

The present application is a continuation application of PCT Application No. PCT/JP2007/073858 titled "GAP WINDING MOTOR" and filed on Nov. 12, 2007, and claims foreign priority to Japanese Application No. JP 2007-008924 filed on Jan. 18, 2007, which are incorporated herein by reference.

BACKGROUND OF THE INVENTION

1. Field of the Invention

The present invention relates to brushless DC motors which function as drive motors for use in the industrial field of, for example, factory automation (FA) and office automation (OA), or as drive motors for electric automobiles. In particular, the present invention relates to a so-called gap winding motor, which is a smooth-armature winding motor in which armature winding for generating a rotating magnetic field is attached to an inner peripheral surface of an annular stator core which does not have salient magnetic poles (slots).

2. Description of the Related Art

Gap winding motors are known as motors with low torque ripples, and are commonly used. In general, a gap winding motor is structured as disclosed in, for example, Japanese Unexamined Patent Application Publication No. 2007-published on May 24, 2007. More specifically, the gap winding motor includes a cylindrical frame, a load-side bracket fixed to an end of the frame, a counter-load-side bracket fixed to the other end of the frame, a stator, and a rotor. The stator includes a stator core fixed to an inner peripheral surface of the frame and a plurality of thin-ring-shaped air-core coils for generating a rotating magnetic field (hereinafter simply referred to as air-core coils). The air-core coils are attached to an inner peripheral surface of the stator core. The rotor is disposed inside the air-core coils with air gaps therebetween in the radial direction.

SUMMARY OF THE INVENTION

An aspect of the present invention provides a gap winding motor including armature winding structured by arranging a plurality of air-core coils for generating a rotating magnetic field on an inner peripheral surface or an outer peripheral surface of a stator core. An air-gap section is provided in the stator core, and a terminal processing section for the air-core coils is disposed in the air-gap section.

BRIEF DESCRIPTION OF THE DRAWINGS

The present invention will be described in further detail with reference to the accompanying drawings wherein.

DETAILED DESCRIPTION OF THE PREFERRED EMBODIMENTS

Figure 1:
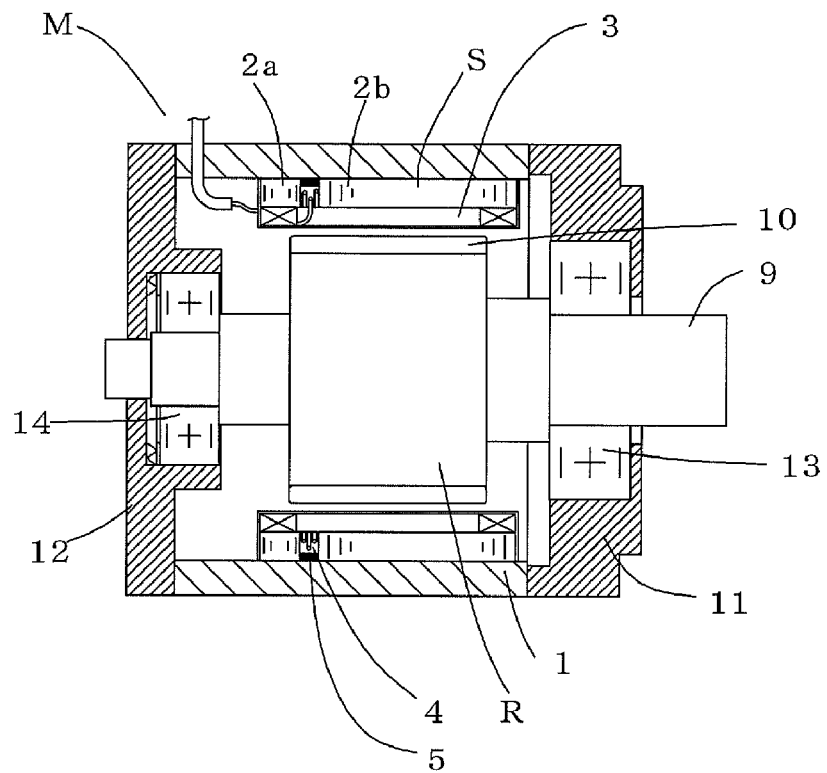
FIG. 1 is a sectional side view of a gap winding motor according to a first embodiment of the present invention.
Figure 2:
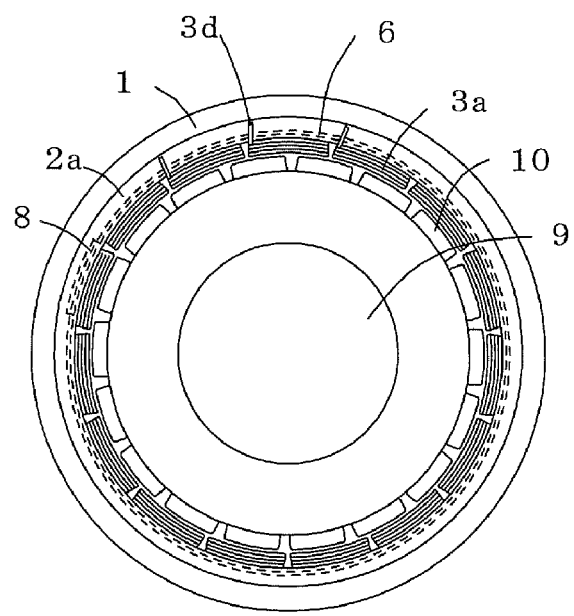
FIG. 2 is a sectional front view of the gap winding motor according to the first embodiment of the present invention.
Figure 3:
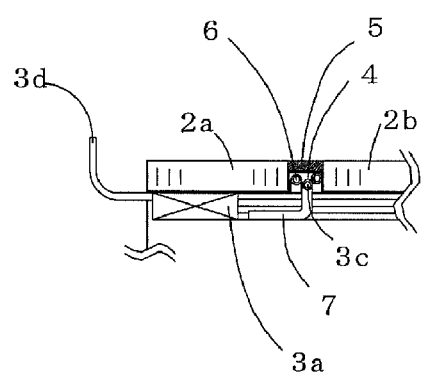
FIG. 3 is an enlarged sectional side view illustrating an electromagnetic section of the gap winding motor shown in FIG. 1.
Figure 4:
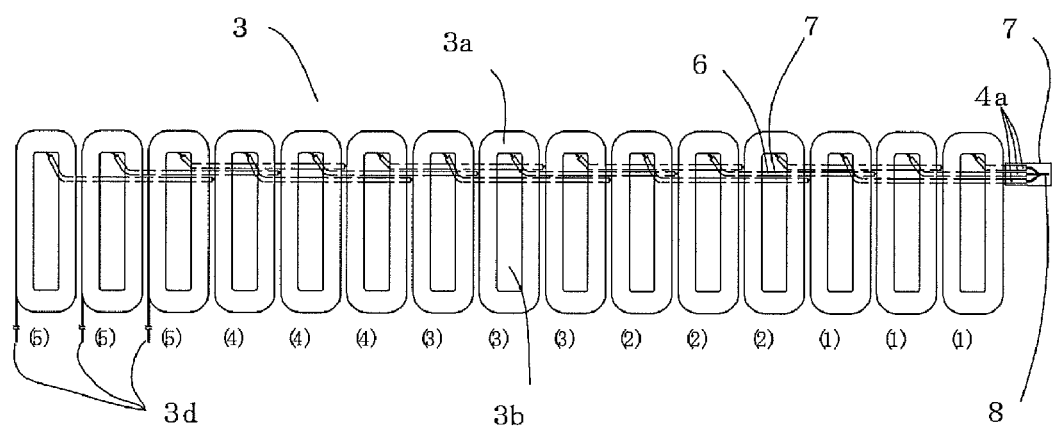
FIG. 4 is a side development of continuously wound coils according to the first embodiment of the present invention.

An embodiment of the present invention will be described with reference to the drawings. FIGS. 1 and 2 are a sectional side view and a sectional front view, respectively, of a gap winding motor according to a first embodiment of the present invention. FIG. 3 is an enlarged sectional side view illustrating an electromagnetic section of the gap winding motor shown in FIG. 1. FIG. 4 is a side development of continuously wound air-core coils. According to the present embodiment, the gap winding motor is a 20-pole, 15-coil inner-rotor gap winding motor.

The structure of the gap winding motor according to the present embodiment will now be described. Referring to FIGS. 1 and 2, the gap winding motor M includes a stator S and a rotor R.

The stator S includes a stator core 2 fixed to an inner peripheral surface of a cylindrical frame 1 and armature winding 3 attached to an inner peripheral surface of the stator core 2. The armature winding 3 includes a plurality of coils, for example, air-core coils 3a, for generating a rotating magnetic field.

An air-gap section 4 is provided in the stator core 2. The air-gap section 4 is formed by, for example, dividing the stator core 2 in an axial direction into a first core portion 2a and a second core portion 2b within a range corresponding to air-core sections 3b of the air-core coils 3a. Thus, the air-gap section 4 is formed as a space formed by separating the core portions 2a and 2b from each other. A lead wire which extends from a counter-load side of the motor to the outside of the motor passes through the air-gap section 4. Therefore, the air-gap section 4 is preferably positioned as close to the counter-load side of the motor as possible.

In addition, a spacer 5 is disposed in the air-gap section 4 between the core portions 2a and 2b of the stator core 2, so that the core portions 2a and 2b and the air-core coils 3a are prevented from being displaced from each other. The spacer 5 is disposed at the outer peripheral end of the stator core 2 in the space between the core portions 2a and 2b. Thus, the air-gap section 4 is formed as a groove formed in the inner peripheral surface of the stator core 2.

In addition, according to the present embodiment, the air-core coils 3a in each phase of the armature winding 3 are formed by continuously winding a single core wire such that the air-core coils 3a are connected to each other. For example, in the case where the armature winding 3 is three-phase armature winding, all of the air-core coils 3a are formed by winding three core wires. FIG. 4 shows the structure of the air-core coils 3a which are continuously wound.

The continuously wound air-core coils 3a shown in FIG. 4 are obtained by continuously winding a plurality of concentrated winding coils. Referring to FIG. 4, fifteen coils in total including five groups of three coils, which are coils (1) to coils (5), are provided. In this case, for example, the rightmost coils (1) to (5) in each group are formed by continuously winding a single coil wire. The starting ends and the terminating ends of the coils in each phase are connected to each other at crossover lines 6 of the continuously wound air-core coils 3a. The air-core coils may also be obtained by α winding instead of concentrated winding. Here, the α winding is the winding manner in which both of the ends of the wire wound into each air-core coil are at the outermost periphery of the air-core coil, that is, the winding manner in which the ends of the wire extend opposite to each other in the shape of 'α' with respect to a fixing shaft used in the winding process.

The rotor R includes a shaft 9 and permanent magnets 10 attached to the shaft 9, and is disposed inside the air-core coils 3a with magnetic air gaps therebetween in the radial direction. The shaft 9 included in the rotor R is rotatably supported by a load-side bracket 11 fixed to an end of the frame 1 and a counter-load-side bracket 12 fixed to the other end of the frame 1. A load-side bearing 13 and a counter-load-side bearing 14 are provided between the shaft 9 and the load-side bracket 11 and between the shaft 9 and the counter-load-side bracket 12, respectively.

In the above-described structure, coil terminals 3c and the crossover lines 6 of the continuously wound air-core coils 3a are disposed in the air-gap section 4, and connection to neutral point is also provided in the air-gap section 4. More specifically, the coil terminals 3c are connected to a neutral point 8 by soldering or the like. FIG. 4 shows an example of the connection structure. In this example, the connection structure of a three-phase coil is shown. An insulating tube 7 is fitted to each of the crossover lines 6 and a connecting section of the neutral point 8, so that the coils can be reliably insulated from each other.

In addition, at least the air gap section and the air-core coils in the stator are subjected to resin molding or impregnation using insulating resin so that the stator core which is divided into the core portions and the air-core coils are integrated with each other. As a result, the fixation strength of the core portions 2a and 2b is increased. In addition, the insulation between the coils is ensured and vibration of the coils due to the current applied thereto can be suppressed.

As described above, the stator core 2 is divided into two core portions 2a and 2b in the axial direction of the motor within a range corresponding to the air-core sections 3b, and the spacer 5 is disposed between the core portions 2a and 2b. Thus, a predetermined air-gap section 4 is provided. In addition, the crossover lines 6 of the continuously wound air-core coils 3a and the neutral point 8 are disposed in the air-gap section 4. Therefore, the coils can be wound in the form of concentrated winding. As a result, the space factor can be increased and the size of the motor can be reduced.

In addition, since the air-core coils 3a are continuously wound and the crossover lines 6 and the neutral point 8 are disposed in the air-gap section 4, no printed circuit board for connecting the coils is required. Therefore, an inexpensive gap winding motor having an electromagnetic structure with high work efficiency and reliability can be provided.

What is claimed is:

1. A gap winding motor comprising:
    a stator including a stator core and armature winding formed by arranging a plurality of air-core coils for generating a rotating magnetic field on an inner peripheral surface or an outer peripheral surface of the stator core, the stator core having an axial direction and comprising:
        a first core portion; and
        a second core portion arranged to face the first core portion in the axial direction via
        an air-gap section formed between the first core portion and the second core portion
        in the axial direction;
    a rotor which faces the stator with a magnetic air gap therebetween, the rotor being rotated by an effect of the rotating magnetic field; and
    a connector section of the air-core coils, the connector section being disposed in the air-gap section, the connector section being disposed completely inside a circumference of the first core portion and the second core portion of the stator core.

2. The gap winding motor according to claim 1, wherein terminals of the air-core coils in each phase are connected to each other with a crossover line, the crossover line being disposed in the air-gap section.

3. The gap winding motor according to claim 2, wherein the air-core coils in each phase are formed by continuously winding a single coil wire, starting ends and terminating ends of the air-core coils in each phase being connected to each other with the crossover line.

4. The gap winding motor according to claim 1, wherein a neutral point of the armature winding is disposed in the air-gap section.

5. The gap winding motor according to claim 1, further comprising a spacer disposed in the air-gap section, the spacer maintaining a constant distance between core portions into which the stator core is divided.

6. The gap winding motor according to claim 3, wherein each of the air-core coils is formed by concentrated winding.

7. The gap winding motor according to claim 2, wherein an insulating tube is fitted to the crossover line, thereby insulating the air-core coils in each phase from each other.

8. The gap winding motor according to claim 4, wherein an insulating tube is fitted to the neutral point, thereby insulating the neutral point.

9. The gap winding motor according to claim 1, wherein at least the air-gap section and the air-core coils in the stator are subjected to resin molding or impregnation using insulating resin so that the stator core which is divided into core portions and the air-core coils are integrated with each other.

* * * * *